US007313530B2

(12) United States Patent
Smith et al.

(10) Patent No.: US 7,313,530 B2
(45) Date of Patent: Dec. 25, 2007

(54) METHODS AND SYSTEMS FOR GENERATING AND DISPLAYING THE CAPACITY OF A DELIVERY MANAGEMENT SYSTEM

(75) Inventors: Timothy Jay Smith, Louisville, KY (US); Vivek Prabhakar Rao, Louisville, KY (US)

(73) Assignee: General Electric Company, Schenectady, NY (US)

( * ) Notice: Subject to any disclaimer, the term of this patent is extended or adjusted under 35 U.S.C. 154(b) by 962 days.

(21) Appl. No.: 09/829,866

(22) Filed: Apr. 10, 2001

(65) Prior Publication Data

US 2003/0023465 A1    Jan. 30, 2003

(51) Int. Cl.
G06F 9/44 (2006.01)
(52) U.S. Cl. .......................................... 705/7
(58) Field of Classification Search .................... 705/7, 705/8
See application file for complete search history.

(56) References Cited

U.S. PATENT DOCUMENTS

| | | | | |
|---|---|---|---|---|
| 5,157,714 | A * | 10/1992 | Spicer ..................... | 379/88.24 |
| 5,265,006 | A | 11/1993 | Asthana et al. | |
| 5,434,394 | A * | 7/1995 | Roach et al. ............... | 235/375 |
| 5,485,369 | A * | 1/1996 | Nicholls et al. .............. | 705/9 |
| 5,623,404 | A * | 4/1997 | Collins et al. ................. | 705/9 |
| 5,666,493 | A | 9/1997 | Wojcik et al. | |
| 5,758,329 | A | 5/1998 | Wojcik et al. | |
| 5,797,113 | A * | 8/1998 | Kambe et al. .............. | 701/201 |
| 5,798,950 | A * | 8/1998 | Fitzgerald .................... | 703/17 |
| 5,848,395 | A * | 12/1998 | Edgar et al. .................... | 705/9 |
| 5,897,629 | A * | 4/1999 | Shinagawa et al. ........... | 706/13 |
| 5,970,466 | A * | 10/1999 | Detjen et al. .................. | 705/8 |
| 5,983,198 | A * | 11/1999 | Mowery et al. .............. | 705/22 |
| 6,049,776 | A * | 4/2000 | Donnelly et al. .............. | 705/8 |
| 6,085,170 | A | 7/2000 | Tsukuda | |
| 6,219,653 | B1 * | 4/2001 | O'Neill et al. .............. | 705/400 |
| 6,240,362 | B1 * | 5/2001 | Gaspard, II ................. | 701/209 |

(Continued)

FOREIGN PATENT DOCUMENTS

JP            405135070 A   *   6/1993

(Continued)

OTHER PUBLICATIONS

Descartes.com—Home, About Descrates, e-Fulfillment Solutions and Products & Solutions web pp. 2000-2001, Retrieved from Archive.org Mar. 16, 2005.*

(Continued)

*Primary Examiner*—Tariq R. Hafiz
*Assistant Examiner*—Scott L. Jarrett
(74) *Attorney, Agent, or Firm*—George L. Rideout, Esq.; Armstrong Teasdale LLP

(57) ABSTRACT

The present invention is adapted to calculate expected capacity utilization information by zone for a respective delivery agent within the zone then to display delivery agent shipping capacity information via a communications network. The present invention further provides a zone capacity calculation and display system that is intuitive and easy for the user to understand. In one exemplary embodiment of the present invention, capacity data may be illustrated for a respective delivery agent on a monthly basis. In another exemplary embodiment of the present invention, the capacity data of a respective delivery agent may be illustrated for a respective zone on a daily basis.

15 Claims, 8 Drawing Sheets

U.S. PATENT DOCUMENTS

| | | | |
|---|---|---|---|
| 6,345,260 B1 * | 2/2002 | Cummings et al. | 705/8 |
| 6,370,509 B1 * | 4/2002 | Ross et al. | 705/1 |
| 6,374,178 B2 * | 4/2002 | Nakagawa et al. | 701/202 |
| 6,577,304 B1 * | 6/2003 | Yablonski et al. | 345/419 |
| 6,701,299 B2 * | 3/2004 | Kraisser et al. | 705/8 |
| 6,801,901 B1 * | 10/2004 | Ng | 705/8 |
| 6,975,937 B1 * | 12/2005 | Kantarjiev et al. | 701/117 |
| 6,985,871 B2 * | 1/2006 | Simon et al. | 705/8 |
| 7,003,720 B1 * | 2/2006 | Davidson et al. | 715/501.1 |
| 7,243,074 B1 * | 7/2007 | Pennisi, Jr. | 705/8 |
| 7,251,612 B1 * | 7/2007 | Parker et al. | 705/9 |
| 2001/0037229 A1 * | 11/2001 | Jacobs et al. | 705/8 |
| 2001/0047285 A1 * | 11/2001 | Borders et al. | 705/8 |
| 2002/0007299 A1 * | 1/2002 | Florence | 705/9 |
| 2002/0010610 A1 * | 1/2002 | Jacobs et al. | 705/8 |
| 2002/0010615 A1 * | 1/2002 | Jacobs et al. | 705/9 |
| 2002/0016645 A1 * | 2/2002 | Jacobs et al. | 700/100 |
| 2002/0046073 A1 * | 4/2002 | Indseth et al. | 705/8 |
| 2002/0099576 A1 * | 7/2002 | MacDonald et al. | 705/6 |
| 2002/0188702 A1 * | 12/2002 | Short et al. | 709/220 |
| 2003/0009361 A1 * | 1/2003 | Hancock et al. | 705/7 |
| 2003/0014288 A1 * | 1/2003 | Clarke et al. | 705/7 |
| 2005/0187833 A1 * | 8/2005 | Royer et al. | 705/28 |

FOREIGN PATENT DOCUMENTS

| | | | |
|---|---|---|---|
| WO | WO 9938079 | * | 7/1999 |
| WO | WO 00/68856 | * | 11/2000 |
| WO | WO 0068859 | * | 11/2000 |

OTHER PUBLICATIONS

Armistead, Colin G. et al., The coping capacity management strategy in services and the influence on quailty performance International Journal of Service Industry Management, vol. 5, No. 2, 1994, pp. 5-22.*

O'Briant, Erin, WebVan ramps up ☐☐IIE Solutions, Sep. 2000, pp. 26-33.*

Murphy, Jean V., Webvan: Rewriting The Rules On 'Last Mile' Delivery SupplyChainBrain.com, Aug. 2000.*

Bort, Julie, A single route to e-comm Network World, Feb. 26, 2001, vol. 18, No. 9, pp. 52, 54, 58, 60.*

ABF Named 50 Best Web Sites—Announces Comprehensive Site Redesign PR Newswire, Jul. 5, 2000.*

Brown, Stuart, How e-tailers deliver within hours Fortune, May 29, 2000, vol. 141, No. 11.*

ABFS.com—eCenter Online Tools Internet Pages ABF Freight Systems, Inc., Jan.-Feb. 2001, Retreived from Archive.org Aug. 18, 2005.*

Treacy, Michael et al., Customer Intimacy and Other Value Disciplines Harvard Business Review, Jan./Feb. 1993.*

Somheil, Timothy, Bringing Good Things to Market Appliance, Jun. 1997.*

Harrington, Lisa, High tech trucking improves fleet performance Transportation & Distribution, Oct. 1999, vol. 40, No. 10.*

Descartes Offers Breakthrough Revenue Management and CRM Capabilities For Consumer Direction and B2B Operations Business Wire, Apr. 17, 2000.*

Wilner, Frank, Is a web-centric approach the way to go?Railway Age, Jul. 2000, vol. 201, No. 7.*

Deutsch, Claudia, G.E.'s Management Methods Are Put to Work on the Web The New York Times, Jun. 12, 2000.*

CarTemps Rent-A-Car—MPOWERENT Management System 2000, Retrieved from www.mpowerent.com.*

Descartes.com—eFulfillment Solutions web pages Mar. 20, 2000.*

Schedule Software Helps Webvan Meet 30-Minte Delivery Window Stores.org, Jul. 2000.*

Nelson, Dorothy—Portfolio and Resume Retrieved from www.dorothynelson.com Mar. 3, 2006.*

Ciccolella, Cathy, GE to ofer online dealer support with CustomerNet Twice, Apr. 21, 1997. vol. 12, No. 10, p. 88.*

Brumbak, Nancy, Sears Plans Big Push in Home Goods HFN, vol. 73, No. 8, Feb. 22, 1999.*

Hanover, Dan, Up next for Sears: Selling appliances on line Chain Store Age, vol. 75, No. 4, Apr. 1999, p. 91.*

Wolf, Alan, Wal-Mart enters majap market with GE appliance pilot program Twice, vol. 15, No. 20, Sep. 4, 2000, pp. 1,6.*

Wolf, Alan, GE's Johnston: Why the Web is imperative Twice, vol. 15, No. 24, Oct. 23, 2000, pp. 1, 36.*

Lowe's selling white goods over relaunched site Twice, vol. 15, No. 28, Dec. 4, 2000, p. 47.*

Weigel, Don et al., Applying GIS and OR Techniques to Solve Sears Technician-Dispatching and Home-Delivery Problems Interfaces, Jan. -Feb. 1999, vol. 29, No. 1, pp. 112-130.*

Partyka, Janice G. et al., On the Road to Service OR/MS Today, Aug. 2000.*

Hodl, James J., Wal-Mart Could Shift Major Appliance Landscape HFN, Sep. 4, 2000.*

Baeb, Eddie, Rivals aiming to pull plug on Sears' appliance push Crain's Chicago Business, Sep. 25, 2000.*

User's Guide to ROADNET 5000: Routing & Scheduling System Version 5.6 Roadnet Technologies United Parcel Service of America, Inc., 1996.*

Jaccoma, Richard, Frigidaire Launches Its Own Computer-Driven Distribution System Dealerscope Merchandising, vol. 34, No. 10, Oct. 1992.*

Byrnes, Nanette, Transportation and logistics: Whirpool Financial World, vol. 162, No. 19, Sep. 1993, p. 61.*

Witt, Clyde E., Whirlpool Puts New Spin on Third-Party Logistics Material Handling Engineering, vol. 52, No. 6, Jun. 1997, pp. 50-53.*

McGovern, Michael J., Load Management Software Transportation & Distribution vol. 40, No. 3, Mar. 1999, pp. 29-30, 32.*

Andel, Tom, Running and winning with E-Commerce Transportation & Distribution, vol. 40, No. 4, Apr. 1999.*

Cordean, Jean-Francois et al., A Tabu Search Algorithm For The Site Dependent Vehicle Routing Problem With Time Windows INFOR, vol. 39, No. 3, Aug. 2001, pp. 292-298.*

* cited by examiner

Capacity Report

| | |
|---|---|
| DMS Location: | Cincinnati, OH —352 |
| Delivery Agent: | Pharo Trucking —354 |
| Assign Location Code: | 104P —356 |
| Schedule Code: | 01 ▽ —358 |
| DMS Scheduled Name: | Home Delivery ▽ —360 |
| Zone Group Name: | Cincinnati/Dayton ▽ —361 |

350

362— [ Previous Month ]   [ Next Month ] —364

| Month Year | | | | | | |
|---|---|---|---|---|---|---|
| Sun | Mon | Tues | Wed | Thur | Fri | Sat |
| | | | | | [1] Capacity: 16 Reserved: 0 Delivery: 0 | [2] Capacity: 0 Reserved: 0 Delivery: 0 |
| [3] Capacity: 16 Reserved: 0 Delivery: 0 | [4] | [5] | [6] | [7] | [8] | [9] |
| [10] | [11] | [12] | [13] | [14] | [15] | [16] |
| [17] | [18] | [19] | [20] | [21] | [22] | [23] |
| [24] | [25] | [26] | [27] | [28] | [29] | [30] |
| [31] | | | | | | |

Daily Capacity Report

DMS Location: Cincinnati, OH
Delivery Agent: Pharo Trucking

Assign Location Code: 104P
Schedule Code: 01
DMS Schedule Name: Home Delivery
Zone Group Name: Cincinnati/Dayton

| Date | Day | | No Override Exists | |
|---|---|---|---|---|
| Schedule Name | Home Delivery | | | |
| Zone: | Default Cap. | Override Cap. | Usage | % Usage |
| Cincinnati | 15 | | 6 | 40 |
| Groups | | | | |
| Dayton | 0 | | 0 | 0 |
| Metro east | 5 | | 1 | 20 |
| Metro west | 5 | | 5 | 100 |
| No Kentucky | 3 | | 0 | 0 |
| Northwest | 3 | | 0 | 0 |
| Southeast | 3 | | 0 | 0 |

Override Reason:

FIG. 8

METHODS AND SYSTEMS FOR GENERATING AND DISPLAYING THE CAPACITY OF A DELIVERY MANAGEMENT SYSTEM

CROSS REFERENCE TO RELATED APPLICATIONS

This application is related to co-pending U.S. patent application, 9D-EC-19335, Ser. No. 09/475,961, entitled "Delivery Management System", filed on Dec. 30, 1999, assigned to the assignee of the present invention, and herein incorporated by reference. This application is also related to co-pending U.S. patent application, 9D-EC-19319, Ser. No. 09/475,962, entitled "Capacity Monitoring Process For A Goods Delivery System", filed on Dec. 30, 1999, assigned to the assignee of the present invention, and herein incorporated by reference. This application is further related to co-pending U.S. patent application, 9D-EC-19310, Ser. No. 09/475,630, entitled "Internet Based Goods Delivery System", filed on Dec. 30, 1999, assigned to the assignee of the present invention, and herein incorporated by reference.

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights.

BACKGROUND OF THE INVENTION

This invention relates to a capacity tracking and display system and more particularly to an Internet based goods delivery capacity tracking and display system.

Delivery management systems exist that provide capacity utilization information but such systems do not make the information easy to view at a level that is useful to the user. These systems display capacity utilization information based on available capacity, reserved capacity and used capacity on a monthly basis, however, no other formats or related information is displayed.

It is desirable to provide a system wherein delivery and installation capacity can be calculated by geographic area and that can display near real time area capacity in an easily readable format. It is additionally desirable to provide a system wherein delivery capacity information can be displayed on a periodic basis and that provides sufficient detail to enable the user to manage the delivery resources in an efficient manner.

BRIEF SUMMARY OF THE INVENTION

Briefly, therefore, this invention provides for a method of determining and displaying capacity utilization of a goods delivery system from a supplier to a buyer utilizing a system having at least one delivery agent, at least one store, at least one manufacturer, and a plurality of buyers, wherein the at least one delivery agent, at least one store, and the at least one manufacturer are coupled to a communications network. In an exemplary aspect the present invention is a method of displaying the capacity utilization of a goods delivery system, the goods delivery system having at least one delivery agent location, address and delivery zone. The method of displaying the capacity utilization comprises the steps of: getting delivery agent information; calculating the delivery capacity for the delivery agent information; calculating delivery capacity used for the delivery agent information; calculating usage information for the delivery agent information; and displaying a periodic calendar format illustrating delivery agent information and delivery agent statistics for a respective zone for each day in the respective period.

In an exemplary embodiment, capacity utilization is displayed on a daily basis for a period of one month, said monthly data adapted to be displayed for any adjacent month of the monthly date being presently displayed.

The periodic calendar is further adapted to have drill down capability to display additional daily details. In one aspect, a specific day of monthly data may be viewed displaying default capacity, override capacity, capacity used, and percent capacity used.

BRIEF DESCRIPTION OF THE DRAWINGS

FIG. 7 is an illustration of an exemplary monthly capacity report of the present invention; and FIG. 8 is an illustration of an exemplary daily capacity report of the present invention.

DETAILED DESCRIPTION OF THE INVENTION

It is an object of the present invention to collect delivery agent shipping capacity data over a communications network, then to calculate expected capacity utilization information by zone for a respective delivery agent within the zone. It is a further object of the present invention to provide zone capacity information for a respective delivery agent and a display system that is intuitive and easy for the user to understand. In one exemplary embodiment of the present invention, capacity data may be illustrated for a respective delivery agent on a monthly basis. In another exemplary embodiment of the present invention, the capacity data of a respective delivery agent may be illustrated for a respective zone on a daily basis.

Figure 1:
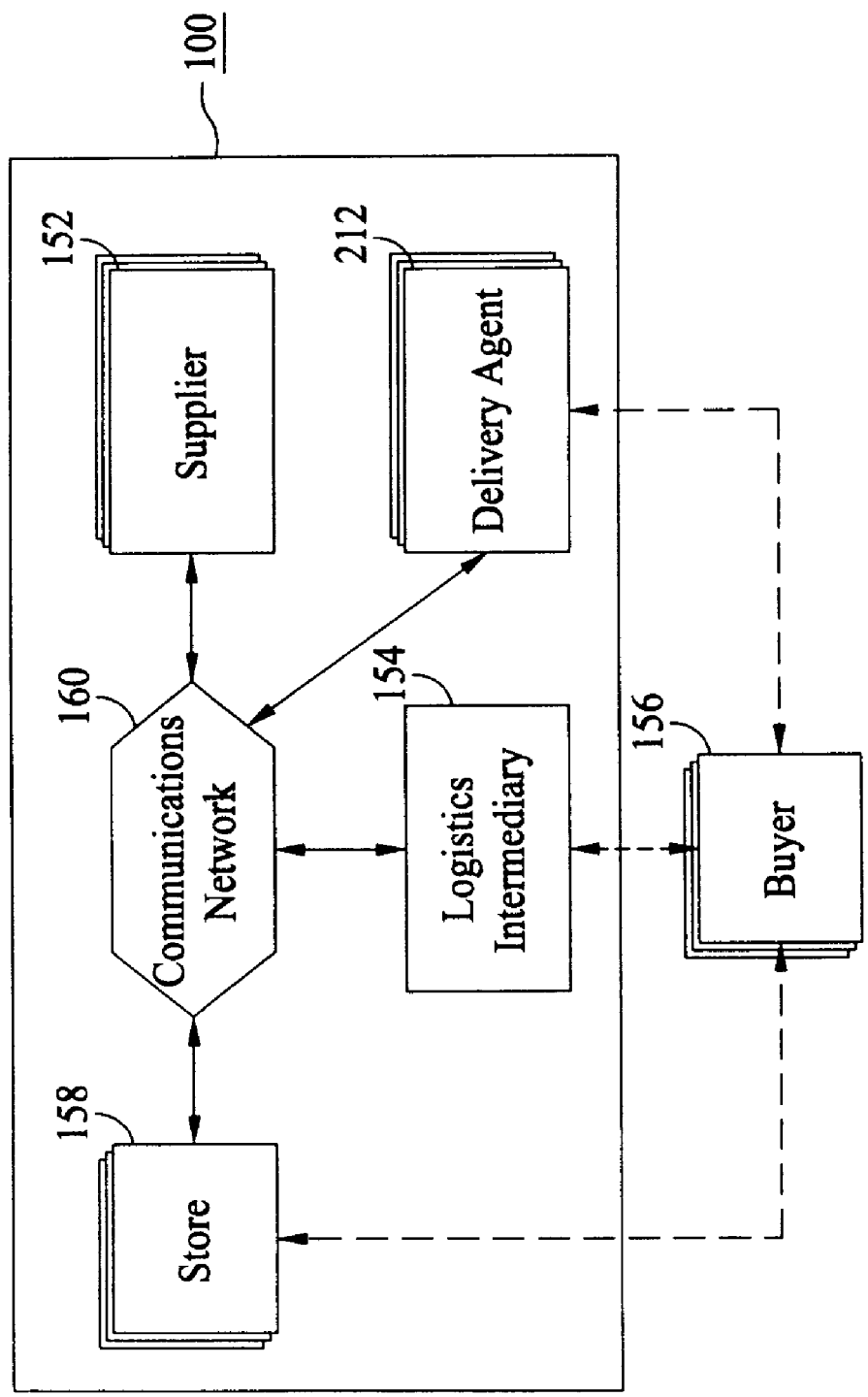
FIG. 1 is an illustration of the communication interchange between components of the goods delivery system of the present invention.
Figure 2:
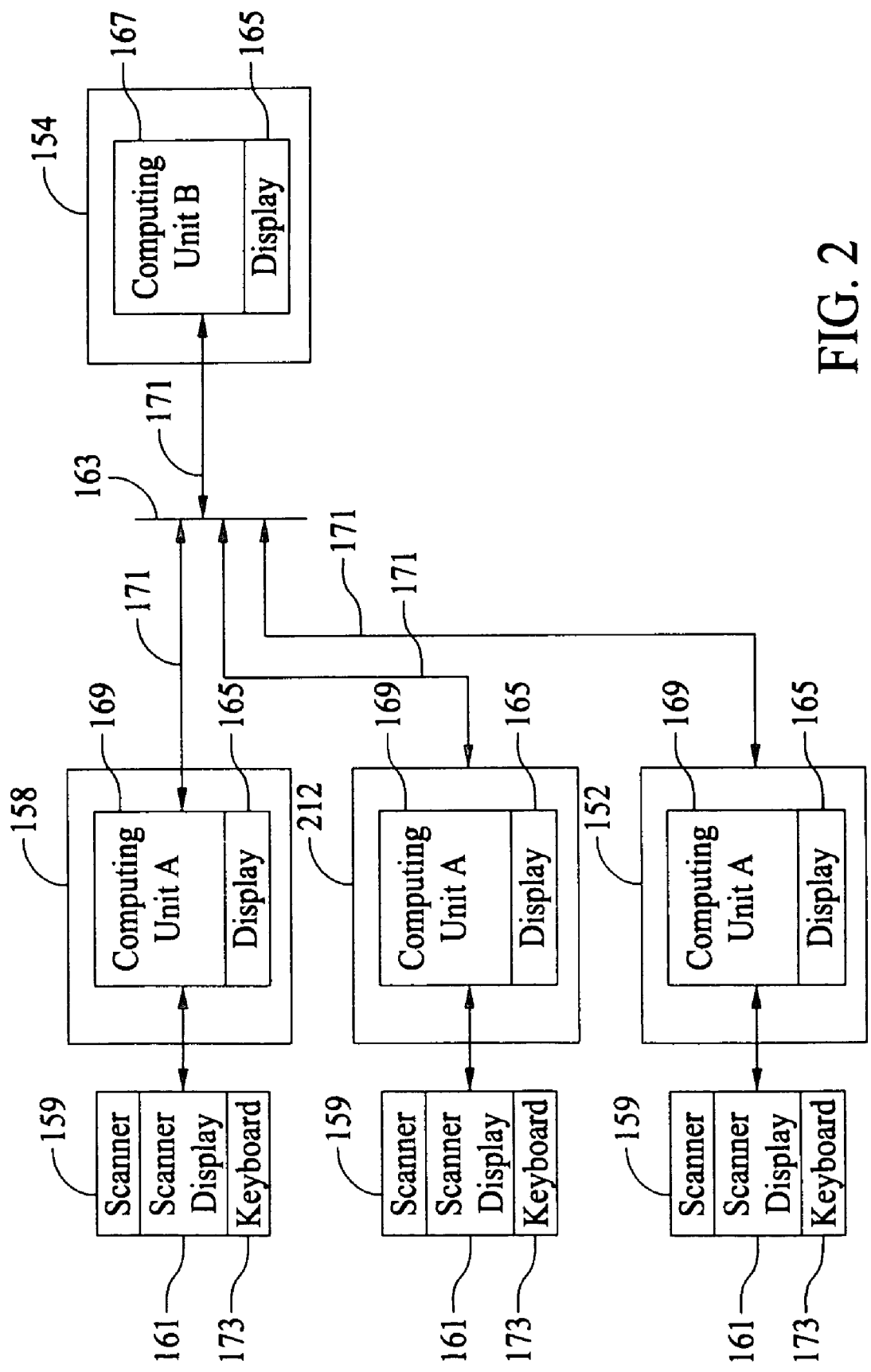
FIG. 2 is an further illustration of an Internet based communications network and associated elements illustration in FIG. 1.

Now referring to FIGS. 1 and 2, which illustrate the major components comprising goods delivery system 100, wherein like reference numbers identify like elements, goods delivery system 100 comprises components that cooperate in a process that integrates logistical supply chain parties by utilizing the Internet, commercially available scanners, and Internet based programs. The system creates the capability for a product distribution supplier to seamlessly interact with sellers of the supplier's products and suppliers to the sellers and buyers. Each supplier to the seller, and alternatively, to the buyer, is hereinafter defined as a delivery agent 212. All parties of the above identified logistical supply chain may execute roles and responsibilities while minimizing human interaction between the parties.

Goods delivery system 100 comprises at least one supplier 152, at least one delivery agent 212, a logistics intermediary 154, at least one store 158, and communications network 160. Additionally, a respective buyer 156 can interface with goods delivery system 100. Buyer 156 typically places an order at a respective store 158 requesting a desired good to be shipped, a desired delivery date, and a desired installation service. At each store 158 delivery agent 212 and supplier 152 there is at least one computing unit A 169, which is coupled to a computing unit B 167 via communications network 160. In one embodiment, communications network 160 comprises a Internet based communications link 171 and a web server 163. Communications link 171 may use audio and alternatively fiber optic communications means to support server 163 based communications. In one embodiment computing unit A 169 and computing unit B 167 communicate using the Transmission Control Protocol/Internet Protocol (TCP/IP). Server 163 is typically a Internet based server which interfaces with a plurality of browsers so as to effect Internet based communications. One exemplary server is the Netscape Application Server NAS. Computing unit A 169 and computing unit B 167 comprises a respective browser. One exemplary browser is the MICROSOFT INTERNET EXPLORER 4.0™. Computing unit A 169 may also comprise a commercially available display 165 and a commercially available scanner 159. Scanner 159 also has a scanner display 161, a keyboard 173, and is adapted to interface with computing unit A 169.

In an exemplary embodiment the server may be accessed by a respective computing unit A 169 and computing unit B 167 by providing a web address having a registered Uniform Resource Locator (URL) hyperlink "www.geappliances.com" and by providing an associated password on most commercially available web browsers. Computing unit B 167, located at logistics intermediary 154, houses the software which comprises the above referenced delivery management system and the capacity monitoring and prediction system of the present invention. It is noted that the electronic manifest may be located at any component of the goods delivery system, including, for example, store 158, delivery agent 212, and supplier 152. Computing unit B 167 provides a delivery management control process that effectuates control and enables information storage for goods delivery system 100. Additionally the delivery management system and the capacity monitoring and prediction system of the present invention may comprise a computer program storage medium readable by a computer system and encoding a computer program of instructions for executing a computer process for tracking and predicting the capacity utilization of a goods delivery system.

The delivery management system facilitates the scheduling of all deliveries from supplier 152 to buyer 156 by delivery agent 212, based on the delivery date selection at the point-of-sale. The point-of-sale may, by way of example and not limitation, be respective store 158, respective supplier 152, respective delivery agent 212, or respective buyers delivery address. Copending U.S. patent application 9D-EC-19310, Ser. No. 09/475,630 provides details of the Internet based goods delivery system. Copending U.S. patent application 9D-EC-19335, Ser. No. 09/475,961 provides details of the delivery management system.

Figure 3:
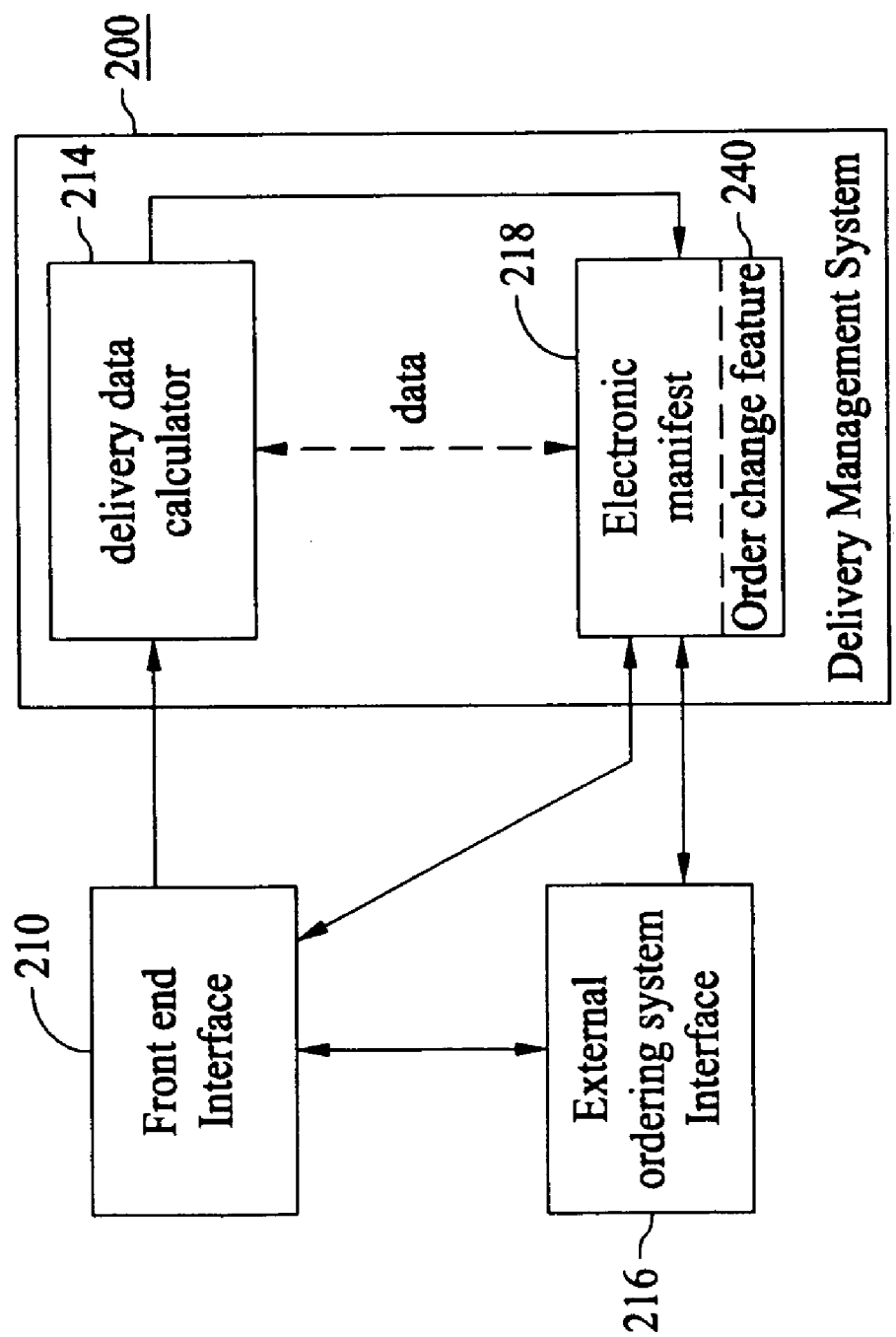
FIG. 3 is a schematic block diagram of a delivery management system of the present invention.

A delivery management system block diagram 200, as illustrated in FIG. 3, provides the process that controls the goods delivery system described in co-pending U.S. patent application, 9D-EC-19335, Ser. No. 09/475,961. Delivery management system 200 facilitates the scheduling of all deliveries from suppliers, to delivery agent locations, then to the buyer or store regardless of good supplier while allowing for delivery date selection at the point-of-sale. Scheduling is performed by day at a zip code and alternatively at a zip group level.

A supplier ship schedule defines the daily frequency that suppler 152 will ship goods to each respective delivery agent 212. For example, respective suppler 152 may ship goods to respective delivery agent 212 every Monday, Wednesday, and Friday. This schedule also includes a delay feature which accounts for the time interval from arrival at the delivery agent's dock through the time that the good is available to be shipped to buyer 156. This delay feature, in effect, is a variable that can be modified to account for transit time and unloading time from supplier 152 to delivery agent 156. Table 1 illustrates one exemplary supplier ship schedule. The first row identifies the day the order is processed, which in this example can occur on any day from Monday through Sunday. The next row identifies the day the order is shipped from supplier 152. In this case it is based on a Tuesday and Thursday ship schedule and incorporates a 24 hour order processing delay. As such, for example, a Monday order will ship on Tuesday and a Tuesday order will ship on Thursday. Row three identifies the day the order arrives at the respective delivery agent's location. In this example 48 hours of delay are added to allow for transit time. Additionally, row four is the delay before the good is available for shipping from respective delivery agent 212 to buyer 156. As such, in this example, a Monday order will be available for shipment to buyer 156 on Friday and a Tuesday order will be available for shipment on the following Tuesday. It is understood that any shipping schedule may be used. Supplier 152 typically generates a unique shipping schedule for each delivery agent 212. The respective supplier ship schedule is loaded into electronic manifest 218 and can be modified at any time by respective supplier 152.

TABLE 1

| Supplier Ship Schedule | | | | | | | |
|---|---|---|---|---|---|---|---|
| Order | Mon | Tue | Wed | Thu | Fri | Sat | Sun |
| Ship from Supplier | Tue | Thu | Thu | Tue | Tue | Tue | Tue |
| Arrive at delivery agent | Thu | Mon | Mon | Thu | Thu | Thu | Thu |
| Delay | Fri | Tue | Tue | Fri | Fri | Fri | Fri |

A delivery agent capacity matrix defines the delivery capacity and schedule for a defined delivery area to be served by delivery agent 212. Delivery agent 212 will have generated a capacity matrix residing in electronic manifest 218 for each zone associated with the delivery agent's delivery area. The delivery area is identified as a zone in this specification. A zone is the broadest geographical area of a delivery agent's territory and comprises a zip code set, the zip code set comprising at least one zip code. Within the territory of delivery agent 212 there is at least one shipping zone. Within each zone there is at least one schedule type, also identified as a zip group. The zip group within a zone comprises at least one zip code, the respective zip code also being a subset of the zip code set of the zone. Delivery agent 212 may choose to select and arrange zip groups so as to be able to vary service levels and vehicles or work crews. For each zip group within a zone, the delivery agent designates a maximum number of delivery slots for each delivery day, called the group maximum, each delivery slot representing the respective delivery agent's delivery capacity for the day. For example, Table 2 is an illustration of one exemplary delivery agent capacity matrix for a zone. Row one identifies the day of the week. Row two identifies the zone maximum for each respective day. In this example the zone maximum number is 30 representing the total number of work units the delivery agent's vehicles can deliver in a day. For example, if this delivery agent has 3 vehicles and each vehicle can deliver 10 slots, then the delivery agent can deliver a total of 30 slots.

TABLE 2

Delivery agent capacity matrix for a zone

| | Mon | Tue | Wed | Thu | Fri | Sat | Sun |
|---|---|---|---|---|---|---|---|
| Total slots for zone | 30 | 30 | 30 | 30 | 30 | 10 | 0 |
| Zip group 1 slots | 30 | 30 | 30 | 30 | 30 | 0 | 0 |
| Zip group 2 slots | 30 | 0 | 30 | 0 | 30 | 0 | 0 |
| Zip group 3 slots | 0 | 10 | 0 | 10 | 0 | 10 | 0 |
| Total opportunities | 60 | 40 | 60 | 40 | 60 | 10 | 0 |

In the example illustrated in Table 2 the zone maximum for Monday through Friday is 30 and the zone maximum is 10 on Saturday because of the delivery limitation for zip group 3. Since zip groups one and two can have three vehicles assigned they each may be allocated 30 slots, also identified as the zip group maximum. It should, however, be noted that the zip group maximum for any one zip group cannot exceed the zone maximum for that day. Each zip group is activated for a given day by selecting a zip group maximum which designates the number of slots that a given zip group can select from the zone maximum. A zero zip group maximum deactivates a zip group for that day of the week. The total number of individual zip group maximums may exceed the zone maximum and is identified in this specification as the total opportunities in row five. The present invention is adapted to override zone and zip group maximums by date, also referred to as the overrive capacity 422 (FIG. 8). This feature enables the delivery agent to use available delivery slots within areas where the "sharing" of slots is logistically feasible, while allowing the flexibility to create areas that, due to geographical challenges or business channel needs, can be isolated from the other areas and not subject to the "sharing" of slots. Delivery agent 212 and alternatively logistics intermediary 154 also has the ability to override the zip group maximum on holidays or special days by identifying the day and the limitation. This feature insures that the proper selection criteria and display are presented at the point-of-sale.

The work unit is a multiplication factor associated with each item to be shipped in an order. The work unit incorporates two features including the size of the appliances associated with a delivery load and the degree of difficulty of installation to equalize delivery slots associated with each capacity matrix. Table 3 is an illustration of the work units calculations to equalize the slot designation for each respective item that is shipped. Also supplier 152 can determine the number of slots that will be filled by a single delivery. By way of example, a 48 foot truck can hold up to about 114 slots and a 53 foot truck can hold up to about 126 slots. Table 3 illustrates one example of the number of appliance goods to fill a 53 foot truck and the associated number of slots. The number of appliance goods types include a range, a model A refrigerator, a model B refrigerator, and a dishwasher. Supplier 152, typically, generates a work unit matrix associated with the model type of each good that supplier 152 provides. The work unit matrix resides in electronic manifest 218.

TABLE 3

Work units conversion to slots

| Item | Work units per item | Quantity | Number of slots this quantity will fill |
|---|---|---|---|
| Range | 1.5 | 14 | 21 |
| Refrigerator model A | 3.0 | 14 | 42 |
| Refrigerator model B | 3.5 | 14 | 49 |
| Dishwasher | 1.0 | 14 | 14 |
| Full load Total | | | 126 |

Figure 4:
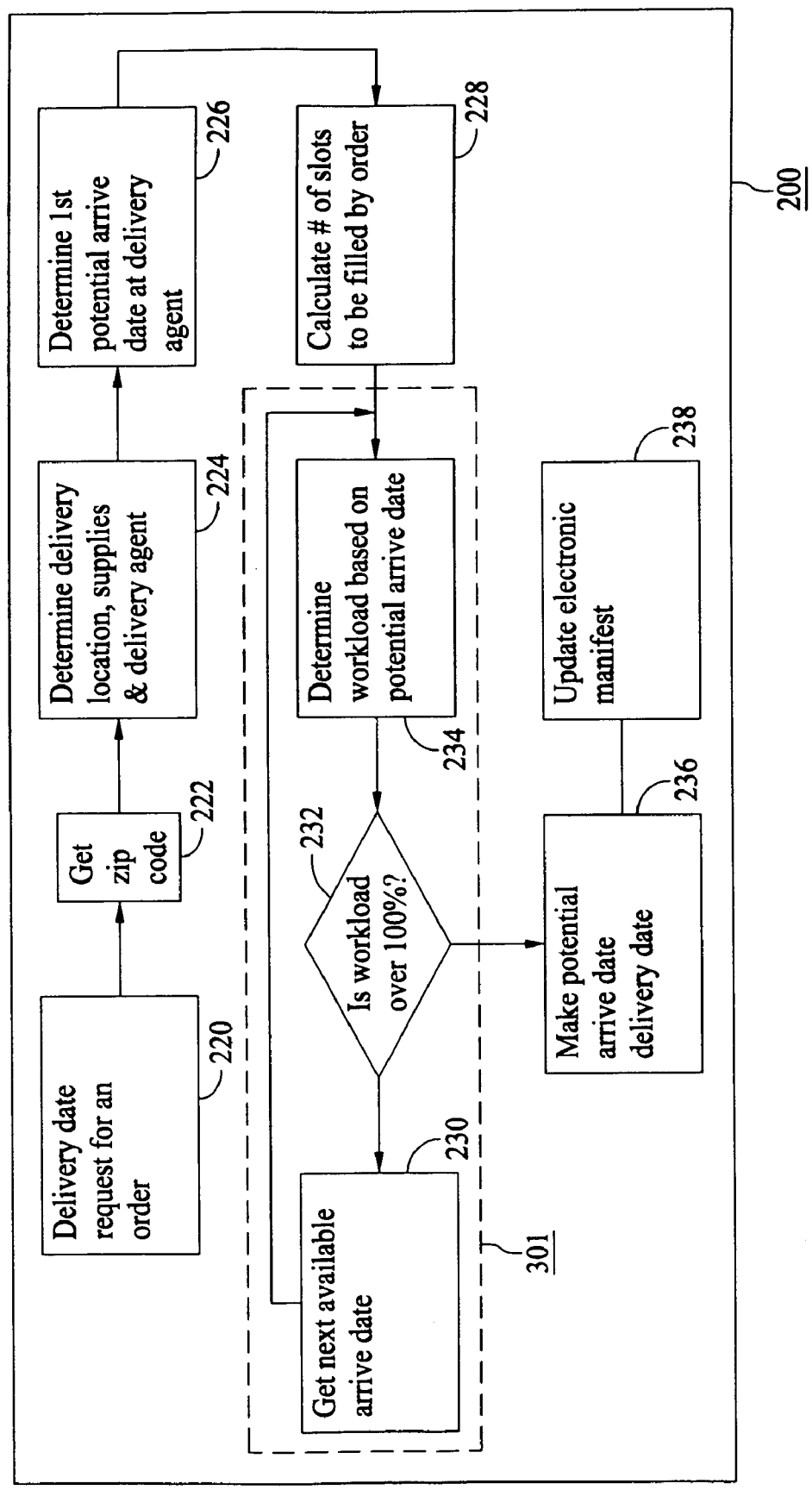
FIG. 4 is a process flow diagram of the delivery management system which utilizes the capacity monitoring process of the present invention.
Figure 5:
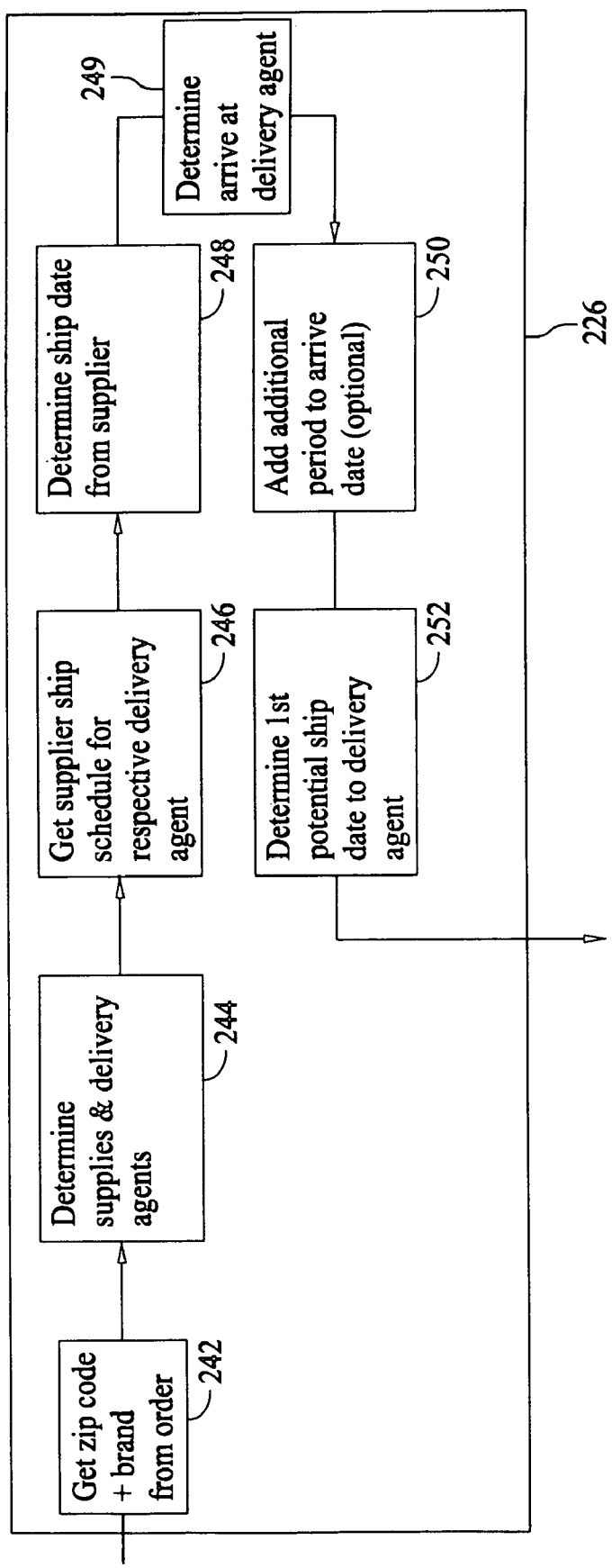
FIG. 5 is a process flow diagram of operation of the delivery management system.

FIGS. 4 and 5, wherein like reference numbers identify like elements, illustrate the process of delivery management system 200. FIG. 5 shows the process of delivery management system 200 identified in FIG. 4. First a delivery date is requested for a respective brand of good, indicated in step 220. Next the zip code of the ordered good is retrieved, step 222. Next, the location of the delivery is determined from the zip code, step 224. The location also identifies the delivery agent to be selected. The brand of the good is used to identify the supplier ship schedule to be used. Next, the first potential arrival date of the order to the selected delivery agent is calculated, step 226. It is understood that the information described above is generally entitled order information, which may comprise, by way of example and not limitation, the order date, the model number, the quantity of items, the brand of the item, the service to be selected, the requested delivery date, the buyer's delivery address, security level clearance information, status information, and the like. Next, the number of slots to be used is calculated, step 228. Next, the delivery agent's change in capacity for the potential arrival date is calculated based on the order size, step 234. Next, a determination is made as to whether delivery agent 212 has the capacity to ship the order on the identified date, step 232. If delivery agent 212 has the capacity, the potential arrival date is identified as the delivery date, step 236. And finally, the electronic manifest is updated to include the shipment, step 238. If the capacity of delivery agent 212 cannot accommodate the order the next available ship date is selected, step 230. The capacity is recalculated utilizing the full capacity of the previous date and the capacity of the newly selected date, step 234. These steps are repeated until the complete order can be delivered, step 232. When the complete order can be delivered the potential arrive date is selected as the delivery date, step 236 and the electronic manifest is updated as before, step 238.

The step of determining the first potential arrival date of the order to the selected delivery agent, step 226, is further illustrated in FIG. 5. The brand of the order and the zip code is selected from the order information, step 242. Next, the appropriate delivery agent and supplier is selected based on the zip code and brand, step 244. The appropriate supplier ship schedule is selected based on the zip code and the brand, step 246. Next, the ship from supplier date is determined based on the order date, step 248. Next, the arrival at the delivery agent date is determined based on the ship from supplier date obtained from the supplier ship schedule, step 249. Next, a delay is added to the delivery agent arrival date, step 250. This date is the first potential ship date to the delivery agent.

One exemplary embodiment, illustrates this process. For example, for an order of brand Y to be shipped to zip code X (e.g. zip code X is associated with zip group 2 of Table 2) a supplier ship schedule (Table 1) is selected and a delivery agent based on zip code X and the brand Y. If the order is received on Monday, the ship from supplier date is Tuesday, the arrive at delivery agent location date is Thursday, and the available for shipment to buyer date is Friday, steps 242 through 252 respectively. Friday, therefore, is the first potential arrive date at the delivery agent location.

Once the first potential arrive date is determined the capacity matrix associated with the number of slots is determined, the number of slots is calculated as described above, step 228. Once the number of slots have been determined the capacity is determined, step 234. For example, assume first that zip group 1 in Table 2 has 20 of 30 slots allocated leaving 10 slots of available ship capacity to either zip group 1 or zip group 2. If the number of needed slots are calculated to be 40 and the available for shipment to buyer date is Friday and zip group 2 is the associated zip group coupled to zip code X. The shipping capacity for Friday is 10 slots, so the next available ship date is the following Monday. The shipping capacity for Friday is set to 100% and the shipping capacity for Monday is calculated to be 30/30 or 100 percent for the zone since the zone capacity for any day is only 30 units. The electronic manifest 218 is updated showing a ship date of Monday and also shows that the capacity for Friday and Monday are full for the associated delivery agent, step 238. Note that co-pending U.S. patent application 9D-EC-19319, Ser. No. 09/475,962, provides details of the capacity calculating and tracking portion of the delivery management system.

In an alternative embodiment, the capacity is may be determined in the following manner. For example, assume first that zip group 1 in Table 2 has 20 of 30 slots allocated leaving 10 slots of available ship capacity to either zip group 1 or zip group 2. If the number of needed slots are calculated to be 30 and the available for shipment to buyer date is Friday and zip group 2 is the associated zip group coupled to zip code X. The shipping capacity for Friday is 10 slots, so the next available ship date is the following Monday. The shipping capacity for Friday is not modified and the shipping capacity for Monday is calculated to be 30/30 or 100 percent for the zip group since the zone capacity for any day is only 30 units. In effect the first available ship date that can accommodate the entire load of needed slots is the only date that is selected. The electronic manifest 218 is updated showing a ship date of Monday and also shows that the capacity for Monday is full but Friday would not be affected for the associated delivery agent, step 238. It is also noted that if the needed slots in this example were 10, Friday would have been selected as the ship date rather than Monday because zip group 2 would have had the needed capacity to ship the order.

Figure 6:
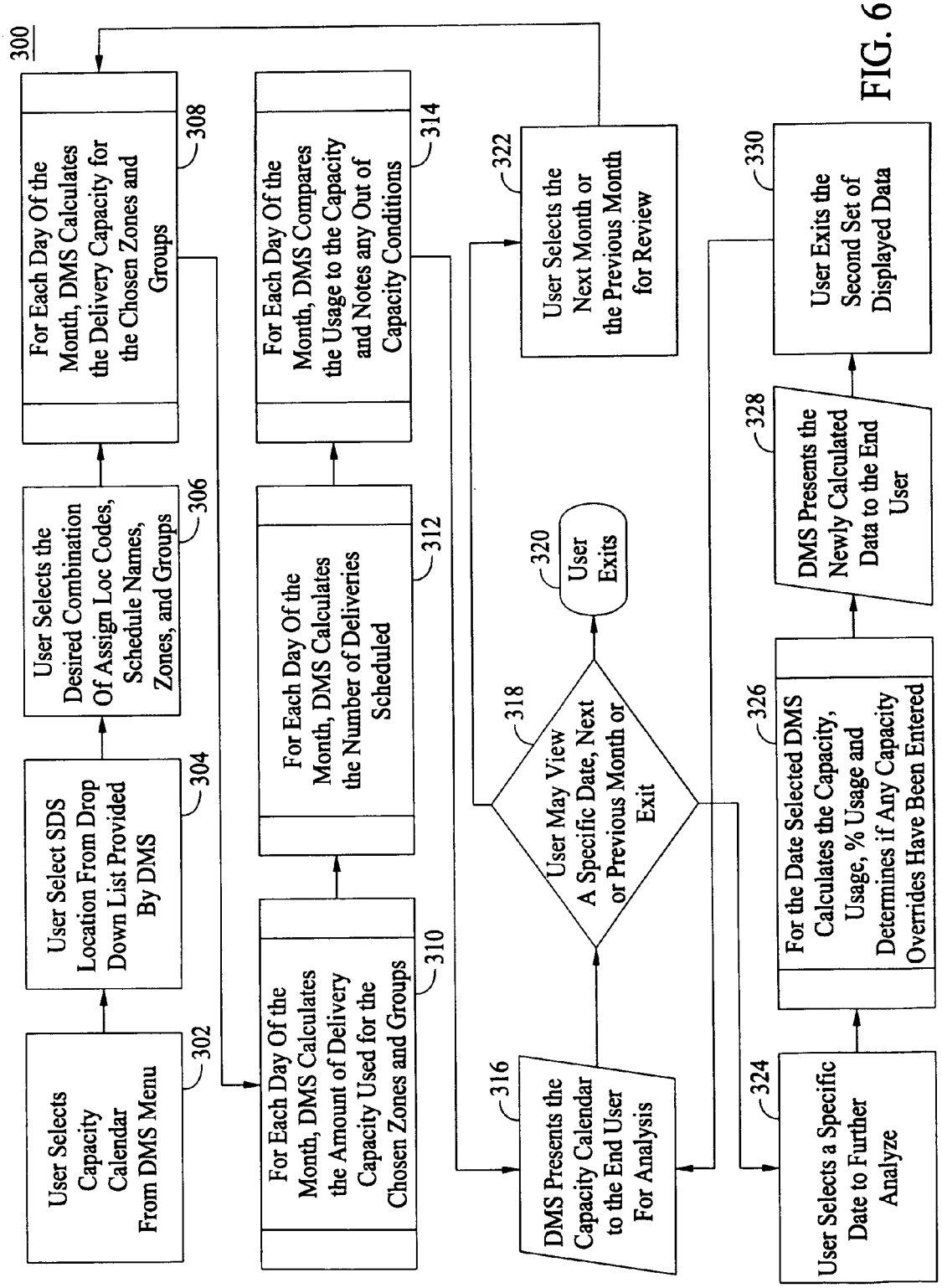
FIG. 6 is an process flow diagram of the capacity display process of the present invention.

Now referring to FIGS. 6 and 7, of the present invention, a process is utilized to calculate the capacity utilization and display in a way that is simple to understand by the user. First a capacity calendar selection is made from the deliver management system 200, step 302. Next a delivery agent 212 location is selected from a drop down list provided by delivery management system 200, step 304. Delivery agent information may comprise data selected from the group consisting of delivery agent location 352, delivery agent name 354, delivery agent code 356, delivery management system schedule name 360, and delivery agent zone group name 361. Delivery agent statistics may be data selected from the group consisting of delivery capacity 368, reserved capacity 370, and deliveries 372. Next, as described in step 306 and illustrated in FIG. 7, a selection is made of the desired combination of assign location codes (alternatively defined as delivery agent locations), 356, schedule names 361, zones and groups 360. Next, delivery management system 200 calculates the delivery capacity 368 for the chosen zones and groups using the process illustrated in FIG. 6, step 308. For each day of the month delivery management system 200 calculates the amount of delivery capacity used for the chosen zones and groups, step 310. For each day of the month delivery management system 200 calculates the number of deliveries scheduled, step 312 based on process 400 identified in FIG. 5 and described above. For each day of the month delivery management system 200 compares the usage of the capacity and notes any out of capacity conditions as described above, step 314. Next, as identified in step 316, delivery management system 200 displays capacity calendar 350 in the manner illustrated in FIG. 7. The previous month may be displayed and alternative the next month may be displayed by repeating the process of FIG. 6, step 322. This process may alternatively be ended, step 320.

The user also has the option of viewing more detail from a drill down button 366 for each one of a selected day within the month being displayed, as illustrated in FIG. 8. This process is further described in FIG. 6, steps 324 through 330. First, a specific date is selected from the displayed capacity calendar 350 using respective drill down button 366, step 324. Next, delivery management system 200 calculates the capacity usage, percent usage and determined if any capacity overrides have been entered, step 326. The default capacity 420 is determined based on the cumulative delivery agent capacity for the specified zone and group, described above. The override capacity 422 is specified by the delivery agent 212, as described above. The usage 424 is the zip group work load identified in step 318, FIG. 5. The percentage used 426 is the usage 424 divided by the default capacity 420. Next, delivery management system 200 displays the default capacity 420, override capacity 422, usage 424, and percent used 426 for the specified zone and each group within the zone, step 328. As such, delivery agent results may comprise data selected from the group consisting of default capacity 420, override capacity 422, capacity usage 424, and percent capacity usage 426. The override reason 430 may optionally also be displayed. This display may also be exited, step 330, wherein the display reverts to the previously selected monthly capacity calendar 350, step 316.

FIG. 8 also shows the delivery capacity 368, reserved capacity 370, and used capacity, also described as deliveries 372. The reserved capacity identifier 370 indicates the number of slots reserved that cannot be utilized. The used capacity header 372 identifies the number of slots that have been allocated for deliveries. Reserved slots are defined as those slots set aside as being used by delivery agent 212 which would otherwise be available slots. Store 158 may set reserve slots to hold otherwise available slots. Reserved slots are treated as used slots in the present invention. The daily capacity report 414 is also adapted to note out of capacity conditions by displaying the zip group 428 that has a percent capacity usage 426 greater than a specific value (for example, one-hundred percent) in an alternative color (for example red) from the other zip groups.

The present invention provides an advantage over the prior art in that delivery agent information may be displayed on a monthly basis, including, for example, delivery capacity, reserved capacity, and used capacity. This level of detail may be displayed for any desired month by incrementally selecting any adjacent month. Further detail may be provided by selected any specific day of the month, wherein further detail is provided. This additional detail provides information about the default capacity, override capacity, capacity used and percent capacity used. This information is useful to the user and gives the user the ability to act on the detailed delivery agent information to make the goods delivery system more efficient.

The present invention is adapted to display delivery agent shipping capacity data over a communications network, then to calculate expected capacity utilization information by zone for all delivery agents within the delivery management system. The present invention further provides a zone capacity calculation and display system that is intuitive and easy for the user to understand. In one exemplary embodiment of the present invention, capacity data may be illustrated for a respective delivery zone on a monthly basis. In another exemplary embodiment of the present invention, the capacity data of a respective delivery agent may be illustrated for a respective zone on a daily basis.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of displaying the capacity utilization of a goods delivery system, the goods delivery system having a delivery agent location, an address and a delivery zone, said method implemented by a computing unit and comprising the steps of:
    obtaining delivery agent information of a delivery agent that delivers a plurality of goods, the delivery agent information comprising at least one of a delivery agent location, a delivery agent name, a delivery agent code, a delivery management system schedule name and a delivery agent zone group name;
    calculating a first delivery capacity for said delivery agent information, the first delivery capacity comprising a first volume defined by a first plurality of slots, each slot defining a slot volume;
    assigning a work unit to each good of the plurality of goods representing a multiplication factor associated with each good and indicative of a portion of the first volume defined by a number of slots used to deliver each good, the work unit generated by a supplier of the good based on a size of the good and a degree of difficulty in installing the good to facilitate equalizing slots for the first delivery capacity;
    calculating, by the computing unit, a portion of the first delivery capacity used for said delivery agent information based on assigned work units;
    calculating usage information for said delivery agent information based on a single day and a delivery zone;
    displaying a periodic calendar format illustrating said delivery agent information and delivery agent statistics for a respective zone for each day in a respective period, the delivery agent statistics comprising at least one of a delivery capacity, a reserved capacity and scheduled deliveries;
    said periodic calendar further adapted to have drill down capability to display additional daily details;
    determining whether the first delivery capacity of the delivery agent to deliver the goods during a first period is exceeded;
    determining whether a second delivery capacity of the delivery agent to deliver the goods during a second period is exceeded; and
    determining to deliver the goods during the second period upon determining that the first delivery capacity is exceeded and the second delivery capacity is not exceeded, wherein the goods are configured to utilize the entire second delivery capacity.

2. The method of displaying as recited in claim 1, wherein the step of calculating usage information further comprises the step of calculating the deliveries scheduled for said delivery agent information.

3. The method of displaying as recited in claim 1, wherein the step of calculating usage information further comprises the step of calculating the percent capacity utilization per day for said delivery agent information.

4. The method of displaying as recited in claim 1, wherein the step of calculating usage information further comprises the step of marking out of capacity conditions.

5. The method of displaying as recited in claim 1, wherein the step of displaying a periodic calendar format comprises the step of displaying daily delivery agent statistics on a monthly basis.

6. The method of displaying as recited in claim 5, wherein the step of displaying a periodic calendar format comprises the step of displaying daily delivery agent statistics on a daily basis.

7. The method of displaying as recited in claim 6, wherein said delivery agent statistics further comprise data selected from the group consisting of default capacity, override capacity, capacity usage, and percent capacity usage.

8. A computer program embodied on a computer readable medium for executing a computer process for displaying the capacity utilization of a goods delivery system, the goods delivery system having a delivery agent location, an address and a delivery zone, said computer program comprising at least one code segment for employing a of displaying the capacity utilization comprising the steps of:
    obtaining delivery agent information of a delivery agent that delivers a plurality of goods, the delivery agent information comprising at least one of a delivery agent location, a delivery agent name, a delivery agent code, a delivery management system schedule name and a delivery agent zone group name;
    calculating a first delivery capacity for said delivery agent information, the first delivery capacity comprising a first volume defined by a first plurality of slots, each slot defining a slot volume;
    assigning a work unit to each good of the plurality of goods representing a multiplication factor associated with each good and indicative of a portion of the first volume defined by a number of slots used to deliver each good, the work unit generated by a supplier of the good based on a size of the good and a degree of difficulty in installing the good to facilitate equalizing slots for the first delivery capacity;

calculating a portion of the first delivery capacity used for said delivery agent information based on assigned work units;

calculating usage information for said delivery agent information based on a single day and a delivery zone;

displaying a periodic calendar format illustrating said delivery agent information and delivery agent statistics for a respective zone for each day in a respective period, the delivery agent statistics comprising at least one of a delivery capacity, a reserved capacity and scheduled deliveries;

said periodic calendar further adapted to have drill down capability to display additional daily details;

determining whether the first delivery capacity of the delivery agent to deliver the goods during a first period is exceeded;

determining whether a second delivery capacity of the delivery agent to deliver the goods during a second period is exceeded; and determining to deliver the goods during the second period upon determining that the first delivery capacity is exceeded and the second delivery capacity is not exceeded, wherein the goods are configured to utilize the entire second delivery capacity.

9. The computer process as recited in claim 8, wherein the step of calculating usage information further comprises the step of calculating the deliveries scheduled for said delivery agent information.

10. The computer process as recited in claim 8, wherein the step of calculating usage information further comprises the step of calculating the percent capacity utilization per day for said delivery agent information.

11. The computer process as recited in claim 8, wherein the step of calculating usage information further comprises the step of marking out of capacity conditions.

12. The computer process as recited in claim 8, wherein the step of displaying a periodic calendar format comprises the step of displaying daily delivery agent statistics on a monthly basis.

13. The computer process as recited in claim 12, wherein the step of displaying a periodic calendar format comprises the step of displaying daily delivery agent statistics on a daily basis.

14. The computer process as recited in claim 13, wherein said delivery agent statistics further comprise data selected from the group consisting of default capacity, override capacity, capacity usage, and percent capacity usage.

15. A apparatus for displaying the capacity utilization of a goods delivery system, the goods delivery system having a delivery agent location, an address and a delivery zone, said apparatus for displaying the capacity utilization comprising:

means for obtaining delivery agent information of a delivery agent that delivers a plurality of goods, the delivery agent information comprising at least one of a delivery agent location, a delivery agent name, a delivery agent code, a delivery management system schedule name and a delivery agent zone group name;

means for calculating a first delivery capacity for said delivery agent information, the first delivery capacity comprising a first volume defined by a first plurality of slots, each slot defining a slot volume;

means for assigning a work unit to each good of the plurality of goods representing a multiplication factor associated with each good and indicative of a portion of the first volume defined by a number of slots used to deliver each good, the work unit generated by a supplier of the good based on a size of the good and a degree of difficulty in installing the good to facilitate equalizing slots for the first delivery capacity;

means for calculating a portion of the first delivery capacity used for said delivery agent information based on assigned work units;

means for calculating usage information for said delivery agent information based on a single day and a delivery zone;

means for displaying a periodic calendar format illustrating said delivery agent information and delivery agent statistics for a respective zone for each day in a respective period, the delivery agent statistics comprising at least one of a delivery capacity, a reserved capacity and scheduled deliveries;

means for said periodic calendar further adapted to have drill down capability to display additional daily details;

means for determining whether the first delivery capacity of the delivery agent to deliver the goods during a first period is exceeded;

means for determining whether a second delivery capacity of the delivery agent to deliver the goods during a second period is exceeded; and means for determining to deliver the goods during the second period upon determining that the first delivery capacity is exceeded and the second delivery capacity is not exceeded, wherein the goods are configured to utilize the entire second delivery capacity.

* * * * *